US012629956B2

(12) United States Patent
Fabian et al.

(10) Patent No.: US 12,629,956 B2
(45) Date of Patent: May 19, 2026

(54) CARD AND METHOD OF PRODUCING THE CARD

(71) Applicant: GIESECKE+DEVRIENT ADVANCE52 GMBH, Munich (DE)

(72) Inventors: Cristina Fabian, Garching (DE); Thorsten Sauer, Erding (DE); Thomas Tarantino, Laufen (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 0 days.

(21) Appl. No.: 18/658,342

(22) Filed: May 8, 2024

(65) Prior Publication Data

US 2024/0286427 A1 Aug. 29, 2024

Related U.S. Application Data

(63) Continuation of application No. 17/642,867, filed as application No. PCT/EP2020/076514 on Sep. 23, 2020, now Pat. No. 12,083,815.

(30) Foreign Application Priority Data

Sep. 30, 2019 (DE) .................... 10 2019 006 799.1

(51) Int. Cl.
G06Q 20/06 (2012.01)
B42D 25/29 (2014.01)
(Continued)

(52) U.S. Cl.
CPC ......... B42D 25/305 (2014.10); B42D 25/455 (2014.10); B42D 25/46 (2014.10);
(Continued)

(58) Field of Classification Search
CPC .... B42D 25/305; B42D 25/455; B42D 25/46; B42D 25/23; B42D 25/29; B42D 25/351;
(Continued)

(56) References Cited

U.S. PATENT DOCUMENTS 6,019,284 A 2/2000 Freeman et al.
7,246,754 B2 * 7/2007 Siuta ..................... G07F 7/1008
340/572.1
(Continued)

FOREIGN PATENT DOCUMENTS

CN 1947160 A 4/2007
DE 4328340 A1 3/1995
(Continued)

OTHER PUBLICATIONS

Search Report from corresponding German Patent Application No. DE 10 2019 006 799.1, Jul. 24, 2020.
(Continued)

*Primary Examiner* — Clifford B Madamba
(74) *Attorney, Agent, or Firm* — Workman Nydegger

(57) ABSTRACT

The invention relates to a card including a computing unit for managing electronic coin data records, the electronic coin data records being issued by a central entity, and a card body with visible data and at least one visible feature. The central entity is at the same time the issuer or administrator of a series of banknotes and the at least one visible feature identifies the card as part of the series of banknotes to an observer. In addition, a method for producing such a card is also proposed.

15 Claims, 3 Drawing Sheets

(51) Int. Cl.

| | |
|---|---|
| *B42D 25/305* | (2014.01) |
| *B42D 25/351* | (2014.01) |
| *B42D 25/455* | (2014.01) |
| *B42D 25/46* | (2014.01) |
| *G06Q 20/34* | (2012.01) |
| *G06Q 20/36* | (2012.01) |
| *G06Q 20/38* | (2012.01) |
| *G07F 7/08* | (2006.01) |
| *B42D 25/23* | (2014.01) |

(52) U.S. Cl.
CPC ....... *G06Q 20/0655* (2013.01); *G06Q 20/341* (2013.01); *B42D 25/23* (2014.10); *G07F 7/0826* (2013.01)

(58) Field of Classification Search
CPC ............. G06Q 20/0655; G06Q 20/341; G06Q 20/065; G06Q 20/342; G06Q 20/367; G06Q 20/3678; G06Q 20/3827; G07F 7/0826; G07F 7/0813
USPC .......................................................... 705/41
See application file for complete search history.

(56) References Cited

U.S. PATENT DOCUMENTS

| | | | |
|---|---|---|---|
| 7,363,265 B2 | 4/2008 | Horgan | |
| 7,975,927 B1 | 7/2011 | Whitney | |
| 10,430,704 B2 * | 10/2019 | Mullen | G06K 19/07709 |
| 10,521,777 B2 | 12/2019 | Zhou et al. | |
| 11,748,741 B2 * | 9/2023 | Rutherford | G06F 21/6245 |
| | | | 705/72 |
| 2003/0010831 A1 | 1/2003 | Ye | |
| 2005/0178822 A1 | 8/2005 | Siuta et al. | |
| 2012/0143769 A1 | 6/2012 | Krishnan et al. | |
| 2015/0073983 A1 | 3/2015 | Bartenstein et al. | |
| 2017/0246899 A1 * | 8/2017 | Cok | G07D 7/01 |
| 2018/0039987 A1 * | 2/2018 | Molino | G06Q 20/4012 |

FOREIGN PATENT DOCUMENTS

| | | |
|---|---|---|
| DE | 10243653 A9 | 11/2006 |
| DE | 102019002731 A1 | 10/2020 |
| DE | 102019002732 A1 | 10/2020 |
| EP | 0542298 A2 | 5/1993 |
| EP | 1259383 A1 | 11/2002 |
| EP | 2344342 A2 | 7/2011 |
| WO | 2016037895 A1 | 3/2016 |
| WO | 2018011108 A1 | 1/2018 |

OTHER PUBLICATIONS

International Search Report and Written Opinion from corresponding PCT Application No. PCT/EP2020/076514, Dec. 21, 2020.

* cited by examiner

CARD AND METHOD OF PRODUCING THE CARD

TECHNICAL FIELD OF THE INVENTION

The invention relates to a card, in particular a chip card for transferring money or non-cash amounts in a payment transaction. The card preferably includes a computing unit for managing electronic coin data records. The card may be configured in the form of a document of value, a check, a credit card, an identity card or other payment card, an ID card or the like. The invention also relates to a method for producing such a card.

TECHNICAL BACKGROUND OF THE INVENTION

It is known to dispose visible data as information on cards, for example by printing, embossing and the like.

Cards of all kinds should be protected against counterfeiting. As a rule, the protection against counterfeiting of cards is ensured by the hardware and/or software components used. However, security elements (as security features), the production of which requires considerable technological effort, are also used to protect cards against counterfeiting. One reason for the popularity of such security elements is that the optical effects caused—for example by diffraction, refraction, lens or micromirror structures—cannot be reproduced even by the most modern copying machines but can be verified quite easily by an observer.

The presence of such a security element with the defined optical effects is evaluated as an authenticity criterion, i.e. the presence of such a security element indicates the authenticity of the card. EP 1 259 383 A1 and EP 2 344 342 A2, for example, each describe cards into which a security element is incorporated.

Cash in the form of banknotes and coins is a conventional means of payment. This means of payment is issued by a central bank and also discarded (destroyed) there. Cash is a centrally organized legal tender.

Conventional means of payment also include cashless payment transactions by bank transfer, check, bill of exchange or direct debit (so-called book money). Other cash substitutes include credit card, prepaid card, traveler's check. It is assumed that these papers certifying a claim to money are in circulation as a means of payment. Circulation begins with the issuance agreement and the associated transfer of the certificate from the issuer to the next holder. This book money is managed by financial institutions, e.g. private or commercial banks, i.e. it is transferred (=booked) between user accounts without cash.

For some time now, there have been digital means of payment, so-called virtual means of payment, which is transferred from a payer to a payee in the form of electronic coin data records through direct communication, for example via a communication network such as the Internet or via contactless near-field communication (card-terminal) or direct contact communication (card-terminal). Famous examples of these virtual means of payment are cryptocurrencies such as Bitcoin, Ether, XRP, Litecoin and Tether, which are mostly organized in a decentralized manner, i.e. they do not require commercial banks or central banks.

The disadvantage of the previous cryptocurrencies is their decentralized organization and the associated low level of acceptance and trustworthiness among customers.

Therefore, an innovative digital means of payment is presented in the German applications DE102019002732 and DE102019002731, wherein a monetary amount can be transmitted between terminals in the form of electronic coin data records. These electronic coin data records are received by a central entity, an issuer or a system operator thereof, and are also discarded (deleted or destroyed) there. These electronic coin data records may be modified by a terminal, for example switched between two owners, or divided or merged. A masked coin data record assigned uniquely and unambiguously to the (unmasked) electronic coin data record may be calculated for each of these electronic coin data records in order to be able to verify their authenticity and structure of ownership. The electronic coin data record is preferably masked by a computing unit within the terminal which also holds or has received the at least one electronic coin data record. The terminal described may also be a card, for example. The entirety of the disclosures in these two applications are referred to in this application, so that these disclosures are to be regarded as part of the disclosure of this application.

This innovative digital means of payment is issued centrally, for example by a central bank which also issues cash in addition to said innovative centrally organized digital means of payment. Alternatively, such an innovative digital means of payment may also be issued centrally by a commercial bank in its own name.

The security of such systems is regularly increased by cryptographic methods, specified payment processes and sometimes also by software and/or hardware measures in the terminal. For example, secure processors are used reversibly or are permanently installed in terminals, or particularly secure runtime environments are provided in addition to the conventional runtime environments.

It is an object of the present invention to provide a particularly secure terminal for such digital means of payment, thereby providing increased security, preferably for the user. In particular, it should also be possible to verify the authenticity of the terminal used, preferably for the user, in order to create greater trustworthiness for digital means of payment.

SUMMARY OF THE INVENTION

The object is achieved by the features of the independent claims. Further advantageous embodiments are described in the dependent claims.

In particular, the object is achieved by a card, in particular a chip card. The card includes a computing unit for managing electronic coin data records, the electronic coin data records being issued by a central entity, and a card body with visible data and at least one visible feature. The central entity is also the issuer of a series of banknotes and the at least one visible feature identifies the card to an observer as part of the series of banknotes.

A chip card, often also referred to as a smart card or (universal) integrated circuit card ((U)ICC), is a card including a card body and a built-in integrated circuit, also called a "chip", which may include non-volatile memory and a microprocessor (=computing unit).

By introducing a visible feature, which is part of a series of banknotes, into the card body, an affiliation of the digital means of payment with the conventional means of payment (series of banknotes) is indicated. The observer immediately realizes that, for the issuer of the banknote series, the card is a means of payment just as secure. In this way, the reputation of the issuer of the series of banknotes is transferred also to said digital means of payment—here by managing the electronic coin data records using the card—and user acceptance of such digital means of payment is increased.

By using a visible feature that is preferably also used as a visible feature in a series of banknotes, the authenticity of the card can be verified much more easily because the observer recognizes the visible feature also used on conventional means of payment. An authenticity verification is thus familiar to the user of the card.

Preferably, the card body comprises at least one paper-like layer or banknote substrate layer. The term "paper-like" is to be understood here as an indication of the effect, so that this paper-like layer acts like paper. This layer is therefore made of a flat material substantially consisting of fibers of vegetable origin forming a non-woven fabric. Papyrus, Tapa, Amatl and Huun—so-called pseudo papers—may also form the paper-like layer. Instead of cotton, bleached pulp may also be used as the base material.

The paper-like layer is preferably a banknote substrate, for example to increase environmental compatibility or to adapt certain card properties (resilience, suitability for everyday use, but also the application of security elements). Banknote substrates have a high level of resilience for everyday use because a banknote is used by a large number of people between production and disposal by the central bank, is often folded, accidentally washed, heated, crumpled up, smoothed again and counted/verified/deposited/spent in machines. In order to withstand this stress, banknote paper consists of a special combination of raw materials made up of 90% cotton. Alternatively, the banknote substrate may also be bleached pulp instead of cotton.

The paper-like layer is preferably provided on a production sheet and is initially completely printed, i.e. application processes such as lithographic, print through, gravure and letterpress printing, offset, screen printing, intaglio and numbering have already been applied to the sheet.

The sheet is preferably laminated on both sides with a foil. Lamination is the joining of a plurality of layers of the same or of different materials (partially foils) with the help of suitable laminating agents (lacquer, glue, wax). Laminating is performed in order to protect and/or decorate the paper-like layer and/or to achieve an addition of favorable material properties by applying the material on or under a layer with the desired properties or by inserting it between two layers.

Furthermore, the paper-like layer preferably consists of a combination of at least two different substrates arranged one above the other and connected to one another, a so-called hybrid. Here, the paper-like layer consists, for example, of a combination plastic foil-paper-plastic foil, i.e. a substrate made of paper is covered by plastic foil on each of its two sides, or of a combination paper-plastic foil-paper, i.e. a substrate made of plastic foil is covered by paper on each of its two sides.

Cards in which such a substrate or security paper may be used are, in particular, high-quality admission tickets, identification papers at risk of forgery such as passports and other identification documents, and cards such as credit or debit cards. The card may be provided with an adhesive layer to serve as a product security element, such as a label or seal.

On the card, visible data and the at least one visible feature may be introduced into the card body or attached to the card body in the manner customary in banknote production. The production process for arranging the (visible data and) visible features is then similar to a corresponding production process for a banknote, thereby simplifying the production of the card.

The card body preferably comprises at least one layer of laminatable plastic. In this way, visible data and the at least one visible feature may be introduced into the card body or attached to the card body in the manner customary in card production. The production process for arranging the visible data and visible features then is similar to a corresponding production process of a conventional card.

More preferably, the card body comprises a plurality of layers, with the visible data and the at least one visible feature being arranged on or in different layers of the card body. The plurality of layers may entirely consist of laminatable plastic or may include at least one paper-like layer (so-called hybrid substrate).

Preferably, the paper-like layer and/or at least one of the layers of the card body is printed, in particular in order to apply information as visible data.

The visible data may include a number, letters, text and/or other characters, such as special characters or currency symbols. On the other hand, images or purely graphic elements are not visible data as defined herein.

The visible data and/or the visible features may be applied to the card body (=substrate), for example by printing, embossing, punching, etc.

The visible data and/or the visible features may be introduced into the card body (=substrate), for example by layer build-up of the card body.

The visible data are preferably data that can be read by the observer. This data may, for example, relate to the cardholder, e.g. the cardholder's name in alphanumeric character strings.

Alternatively or additionally, the visible data are, for example, data relating to the issuer of the card, for example the issuer's name, identification number, etc. Alternatively or additionally, the visible data are, for example, data relating to the central entity, for example the entity's name, country, currency as text. The visible data may thus include a currency indication of the series of banknotes. In addition to the readable visual data, there may be a visual symbol such as a flag.

The at least one visible feature is preferably a security feature, in particular a security feature integrated into the card body. This provides the card body with a security feature that is also contained in banknotes from the banknote series. Mere information (visible data) is not a visible feature as defined herein.

The central entity is an entity responsible or authorized for issuing electronic coin data records. An additional administrative entity, such as commercial bank and/or system operator, is configured and/or authorized by the central entity to manage the electronic coin records. Only optionally, the central entity may also take over the management of the electronic coin data records, either in whole or in part. According to the invention, this central entity is also the issuer of a series of banknotes. Thus, for example, a central bank may be a central entity. The central bank as the issuer of the series of banknotes may also be the issuer of the card according to the invention for the local management of electronic coin data records. The issuer of the card according to the invention is preferably a commercial bank or the additional administrative entity, such as the system operator. According to the invention, it is ensured that an observer of the card will find the visible features used on the series of banknotes also on the card and can thus easily verify the authenticity of the card.

In a preferred embodiment, a series of banknotes is a series of banknotes with different basic denominations. A banknote is a document that serves as legal tender in a certain country or currency area, is issued by an authorized institution, here the central entity (note-issuing bank, central bank), and has a round nominal value as the basic denomination of a currency unit. The security features used on the banknotes preferably correspond to the at least one visible feature of the card.

The at least one visible feature is preferably a series feature. The series feature is a technically uniform feature used throughout the series of banknotes, for example a hologram, a foil, a strip with an optically variable or floating motif, etc.

The at least one visible feature is preferably a series feature. The series feature is an optically uniform feature used throughout the series of banknotes, for example lettering (possibly the visible data) always in a specific font or a map of the country of the central entity. A currency symbol may always be shown in a specific design. A name as a visible data may always be shown in a specific design.

The at least one visible feature is a series feature, and the series feature is meta-information used throughout the series of banknotes. For example, a basic denomination of the series of banknotes or a digital symbol may always be arranged in the same position or in a plurality of positions on the card. The same position then represents the meta-information also used on the series of banknotes.

The at least one visible feature is preferably a series feature, and the series feature is a pattern used throughout the series of banknotes. In this case, for example, the design of a banknote is also applied to the card in order to give an observer a familiar and known pattern already known from the pattern of the series of banknotes.

Alternatively, the at least one visible feature is an independent series feature for the card according to the invention. Thus, in contrast to the series of banknotes, another visible feature is created and incorporated into the card body.

Preferably, the visible feature is furthermore one from a collection of series features from the series of banknotes. In this case, security features established and already used by the central entity for series of banknotes are also used for the card.

In a preferred embodiment, the card body is multi-layered and the at least one visible feature is arranged on an inner layer of the card body.

In a preferred embodiment, the visible data are arranged on an inner layer of the card body. For the visible data to be recognizable by the observer, transparent cover layers are used as lamination layers.

In a preferred embodiment, the card body is multi-layered, and an inner layer of the card body is a banknote. The card is then preferably provided with more than two, in particular all, security features of the series of banknotes and includes, for example, one or more of the following visible features of a banknote, namely: watermark, security thread, security patch, window feature, see-through feature, top-view feature, hologram, kinegram, optically variable printing color, guilloches and the like. The security feature(s) may be a security element. In particular, elements that are produced separately and then transferred or laminated to banknote substrate layers or are integrated into the banknote substrate layer are referred to as security elements. Security elements are, for example, security threads, security patches or security strips, which—each with or without own carrier—are present on or in the banknote substrate layer.

In a preferred embodiment, the dimensions (=format) of the bank note are adapted to the format of the card. The dimensions of the banknote are preferably smaller than the card. The card format may be selected to be, for example, one of the formats for identity documents, in particular ID-1, ID-2, ID-3 and/or ID-000 according to the technical specification ISO/IEC 7810 or a card issuer's own format, such as das Visa mini format. The banknote introduced into this card then has a format which is smaller than the selected card format. For example, the dimension of the banknote corresponds to 90-95% of the dimension of the card, preferably 75-95%, more preferably 50-95%.

In a preferred embodiment, a holder of the card is registered anonymously and/or pseudonymously in the system for managing and transmitting the electronic coin data records—i.e. in particular with the central entity or with the additional administrative entity, such as a commercial bank or system operator. In this way, the advantages of the innovative digital means of payment (management and transmission of the electronic coin data records), in particular the anonymity of the participants and thus the absence of tracking of the payment transactions, are retained.

In a preferred embodiment, the name of the cardholder is known, i.e. at the central entity or at the additional administrative entity. The cardholder preferably has an account with the additional administrative entity (or the central entity). In addition to the innovative digital means of payment (management and transmission of the electronic coin data records), the account may optionally also be used for conventional transactions such as transfers. An issuer of the card is then preferably a commercial bank.

The card preferably includes an electronic display unit configured, in particular, to display monetary amounts of electronic coin data records which are managed in the card and/or are part of a current transaction, for example. In this way, the monetary amount (or the monetary amounts) of the electronic coin data records that are stored on the card and are transferrable may be displayed directly to the cardholder.

The card preferably includes an input unit for user inputs. The input unit may include, for example, one or more, preferably two to four, buttons and/or a (fingerprint) sensor. With the help of the input unit, the holder may, for example, make a selection, enter data and/or enable the transfer of electronic coin data records.

As an interface unit—for the exchange of electronic coin data records—the card will preferably include a near-field communication interface (NFC, RFID) and/or a contact-based interface (ISO 7816, USB, SWP). Electronic coin data records may be loaded onto the card and/or removed from the card via this interface. This is also referred to as transmission of electronic coin data records below.

The card comprises at least one visible feature; it is preferable to provide a plurality of visible features. The greater the number of visible features, the greater the security against counterfeiting.

The at least one visible feature is preferably a basic security feature (so-called level 1 feature) which can be recognized directly by the observer of the card and can be checked/verified without further aids—i.e. by means of the naked eye of the observer. The following examples of visible features for a card are conceivable (the following list should not be understood as restrictive):

A watermark is incorporated as a visible feature during the manufacture of a paper-like layer. In this case, at least one paper-like layer is provided in the card body.

A see-through window as a further example of a visible feature is a window introduced in banknotes based on polymer substrate by locally omitting a coating for accepting ink or in paper-based banknotes by holes punched in the paper substrate and glued over with foil elements.

Preferably, see-through registers and register printing with an additional pattern on the front and back of the foil layers, which only reveal the overall picture when viewed against the light, are used as visible features in order to increase security against counterfeiting. In this case, for example, a hybrid bank note substrate is used.

A transfer and/or foil element, into which optical surface markings that are difficult to reproduce are incorporated, may also be used as a visible feature. Such transfer and/or foil elements are, for example, kinegrams or holograms produced by using patterns on metal or plastic foils.

Guilloches, iris printing, anti-copying raster graphics, colored fibers, micro-perforation, micro-lettering, pearlescent stripes and/or optically variable printing inks may also be used as visible features.

In particular, security threads, security strips or security patches and effect colors are used as visible features.

The card body includes, for example, two laminating layers. Here, thin foil-like layers based on plastic are preferably used as the laminating layer. Each of the laminating layers preferably has an adhesive-wetted upper surface. In addition to lamination, lining is preferably also used to produce the card. If the paper-like layer is located between the two laminating layers, the adhesive is arranged on the upper side of the laminating layer facing the respective paper-like layer.

The card may be produced in a lamination method (lamination). For example, an adhesive used during lamination may better wet the surface of the banknote substrate and thus increase adhesion during the joining process (lamination). This makes it difficult or even impossible to separate the individual layers of the laminated card.

In a preferred embodiment, two paper-like layers are provided as a banknote substrate with a foil layer on the inside, wherein the foil layer has an adhesive coating on both top sides. Said foil layer reinforces the structure of the card and further increases its resilience. Said foil layer is preferably provided with an antenna winding. For example, conductor tracks are printed onto this foil layer as antenna windings. This antenna winding may be electrically conductively connected to a semiconductor chip (the computing unit) of the card in order to form a near-field communication interface, for example NFC or RFID. The semiconductor chip is integrated, for example, in a cavity in the banknote substrate or incorporated on an additional layer of the card. In this way, the functionality of the card can be further increased.

In a preferred embodiment, two paper-like layers are provided as a banknote substrate with an inner foil layer in the card body, wherein the foil layer has an adhesive coating on both top sides. Said foil layer reinforces the structure of the card and further increases its resilience. In addition, this foil layer allows for the introduction of windows that may optionally be used for security elements.

In a preferred embodiment, at least one transparent laminating layer is arranged between the two paper-like layers. More preferably, two paper-like layers are arranged on the outer sides of the laminated card.

In a preferred embodiment, the paper-like layer on the top side has a surface area that is less than the surface area of the card. In other words, the paper-like layer is smaller than the finished laminated card. Thus, the paper-like layer is fully integrated between the two laminating layers. The two transparent lamination layers create a transparent boundary around the paper-like layer.

In a further aspect of the invention, the object is achieved by a method for producing a card of the type described above with the following method steps: providing a card body with visible data and at least one visible feature; and issuing the card by a central entity, the central entity also being the issuer or manager of a series of banknotes and the at least one visible feature identifying the card as a part of the series of banknotes to an observer.

The card body is preferably multi-layered, wherein the individual layers are arranged in a precise fit one above the other and are joined by means of pressure and temperature. This joining is preferably performed by means of a laminating step, possibly in conjunction with a lining step.

Layers of the card are preferably arranged in registers. The positional accuracy of printed images or other elements relative to one another on the front and/or back of the banknote substrate is referred to as register in the context of this invention. For example, in the case of parts of printed images which add up to form an overall printed image when looking through, even small deviations of less than 0.1 mm between the respective printed images significantly disrupt the visual impression when looking through. DIN 16500-2: 1987-01 defines register as the precision in printing technology with which the intended reproduction quality of the details to be reproduced is achieved or maintained. The terms "front" or "back" of the substrate or card are relative terms that may also be referred to as "one" and "the opposite" side and form the majority of the total surface area of the substrate or card. These terms do explicitly not include the side surfaces of a substrate or card, which are negligibly small given a substrate or card thickness of only about one millimeter for card bodies or only fractions of a millimeter for banknote substrates and are usually not provided with security elements or coatings. In particular, no see-through effects can be achieved with the side surfaces.

Here, recesses can be introduced in at least one paper-like layer of the card body, through which recesses underlying and overlying foil layers are in direct contact with one another in order to be joined directly to one another during lamination.

For this purpose, an adhesive is preferably applied to the foil layers and the layers are laminated by applying pressure and temperature.

Recesses are preferably introduced into the at least one paper-like layer by cutting, laser cutting, punching or similar manufacturing steps.

BRIEF DESCRIPTION OF THE DRAWINGS

The invention and further embodiments and advantages of the invention are explained in more detail below with reference to figures, with the figures merely describing exemplary embodiments of the invention. Identical components in the figures are provided with the same reference symbols. The figures are not to be regarded as true to scale; individual elements of the figures may be exaggerated in size or exaggeratedly simplified.

In the figures.

DETAILED DESCRIPTION

Figure 1:
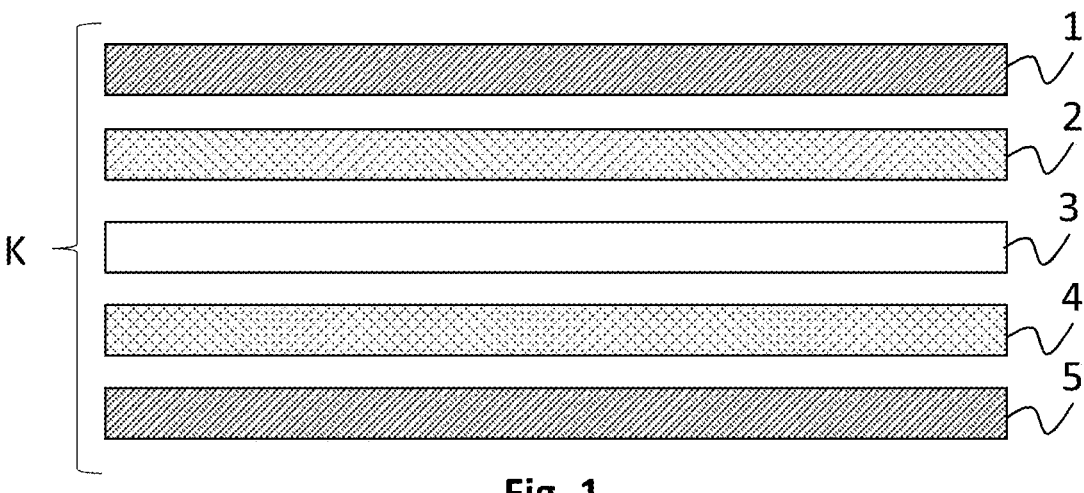
FIG. 1 shows an exemplary embodiment of a card according to the invention shown schematically in cross section.

FIG. 1 shows a layer structure for a laminated card K according to the invention. Here, a foil layer 3 is provided. The foil layer 3 is provided with an antenna winding in order to enable near-field communication when the laminated card is used. As an alternative or in addition to the foil layer 3, a foil composite (not shown) may be provided which includes a semiconductor chip to which the antenna winding of foil layer 3 may be electrically conductively connected in order to provide a near-field communication interface.

The foil layer 3 is wetted with a suitable adhesive on both flat top sides (i.e. on both sides). A banknote substrate 2, 4 is arranged on each of the two top sides of the foil layer 3. This banknote substrate 2, 4 is a paper-like layer and has visible features such as security threads, security strips, holograms, kinegrams, watermarks, etc., cf. FIGS. 4 and 6 for further explanation. The banknote substrate 2, 4 may also include visible data, which may for example be printed, for example for the visual representation of a serial number, a cardholder's name, a bank institute and the like.

One or more lamination layers 1, 5 are arranged on the top side of the banknote substrate facing away from the foil layer 3. For this purpose, these lamination layers 1, 5 preferably have a suitable adhesive on the top side facing the top side of the banknote substrate. The laminating layers 1, 5 are transparent. The laminating layers 1, 5 may be printed to display additional information or visible data.

The paper-like layer 2, 4, 6 preferably consists of a combination of at least two different substrates arranged one above the other and connected to one another, a so-called hybrid. Here, the paper-like layer consists, for example, of a combination plastic foil-paper-plastic foil, i.e. a substrate made of paper is covered by a plastic foil on each of its two sides, or of a combination paper-plastic foil-paper, i.e. a substrate made of plastic foil is covered by paper on each its two sides. Information on the weight of the banknote substrate used is given, for example, in document DE 102 43 653 A9, the specifications of which are included in this application in their entirety. Document DE 102 43 653 A9 states in particular that the paper-like layer usually has a weight of from 50 g/m² to 100 g/m², preferably from 80 g/m² to 90 g/m². Any other suitable weight may be used depending on the application.

Cards K, in which such a substrate or security paper may be used, are in particular high-quality admission tickets, papers at risk of counterfeiting, such as passports and other identification documents, and cards, such as credit or debit cards, product security elements such as labels, seals, packaging and the like.

The simplified term "card" includes all of the above materials, documents and product security devices.

Figure 2:
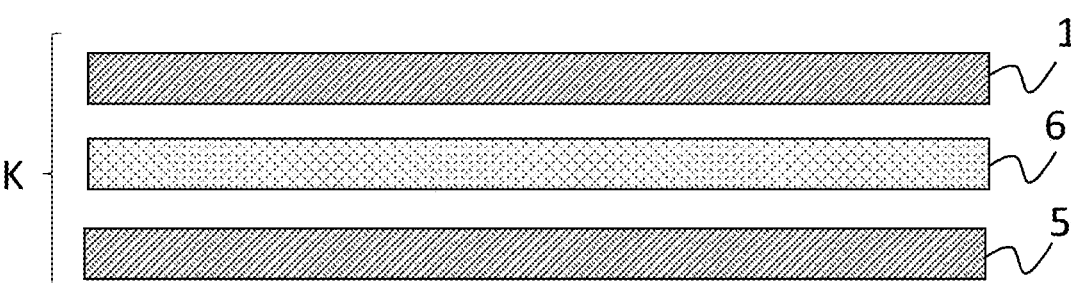
FIG. 2 shows a further exemplary embodiment of a card according to the invention shown schematically in cross section.

FIG. 2 describes a structure of a laminated card as an alternative to FIG. 1. In this case, a single paper-like layer 6 is inserted between two laminating layers 1, 5. For this purpose, these lamination layers 1, 5 preferably have a suitable adhesive on the top side facing the top side of the banknote substrate 6. The laminating layers 1, 5 are transparent. The laminating layers 1, 5 may be printed in order to visualize additional information.

Figure 3:
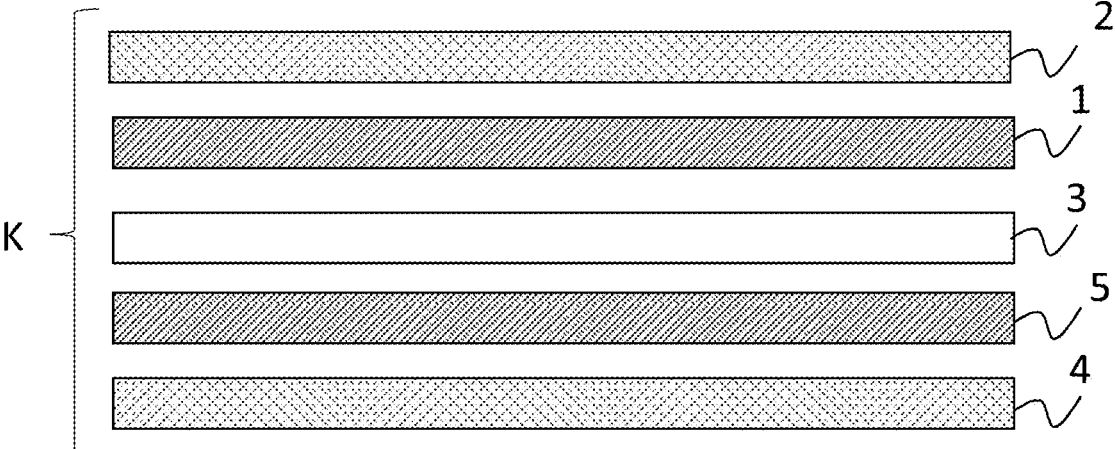
FIG. 3 shows a further exemplary embodiment of a card according to the invention shown schematically in cross section.

An embodiment of a laminated card which is an alternative to FIGS. 1 and 2 is shown in FIG. 3. In this case, the foil layer 3 is arranged between two laminating layers 1, 5. For this purpose, the laminating layers 1, 5 are wetted with an adhesive on both sides. A paper-like layer 2, 4 is arranged on each top side of the laminating layers 1, 5 facing away from the foil layer 3. The embodiments for improving the lamination shown in FIGS. 3 to 6 are also used in the embodiment of FIG. 7.

The layer structure shown in FIGS. 1 to 3 is laminated. In this case, pressure and glass transition temperatures are applied in order to join the laminating layers 1, 5 to the layers 2, 3, 4, 6, so that a material bond is created.

In order to increase the resilience of the card K, recesses may be introduced into the paper-like layers 2, 4, 6 by punching, lasing, cutting, so that an adhesive also flows into the recesses during lamination and thus increases the adhesive force by increasing the surface area or by directly connecting two foil layers 1, 3, 5 (if the recesses are perforations of the paper-like layer).

Because of these recesses, the laminating layer 1 with the laminating foil 5 may also be placed in the recesses due to the effects of temperature and pressure during lamination. The two laminating layers 1, 5 are preferably joined within the recess. The resulting material bond (joining) between the laminating layers 1, 5 significantly increases the mechanical stability of the card K and a risk of delamination (=separation or peeling of the layer structure) of the card K due to external forces or other environmental influences is greatly reduced. The shape of the recesses may be circular, angular, jagged, star-shaped or tooth-shaped. The recesses may be arranged circumferentially around an outer edge of the substrate 2, 4, 6 and, moreover, recesses may be distributed over the entire surface of the paper-like layers 2, 4, 6.

The layer structure shown in FIGS. 1 to 3 is laminated. In this case, pressure and glass transition temperatures are applied to the layer structure in order to join the laminating layers 1, 5 to the other layers 2, 3, 4, 6, so that a material bond is created. The method may be performed as hot lamination, cold lamination or lamination between presses.

During hot lamination, the adhesive of the foil layer 3 or laminating layers 1, 5, which is in the solid aggregate state at room temperature, fuses with the paper-like layer 2, 4, 6. For this purpose, the paper-like layer is arranged corresponding to FIGS. 1 and 2 and is passed, in a laminating device, over hot rollers or between two heating plates, as a result of which the adhesive changes to the viscous aggregate state and the layers 1, 3, 5 are thermally joined at about 60° C. to 120° C. The adhesive is also placed in the recesses (not shown in FIG. 1 to FIG. 3) of the paper-like layer 2, 4, 6 and thus increases the adhesive force in the layered structure.

When laminating between presses, the layer structure shown in FIGS. 1 and 2 is first passed through a heating press and then a cooling press or through a press which can first heat and then cool. In the heating press, the thermoplastic layers are pressed together at high temperatures. If the glass transition temperature is exceeded, the foils 1, 3, 5 bond at their interfaces with the layers 2, 4, 6 and are then cooled again under pressure in a cooling press, so that they are welded together to form a monobloc. This method is preferably used in the card according to the invention.

Figure 4:
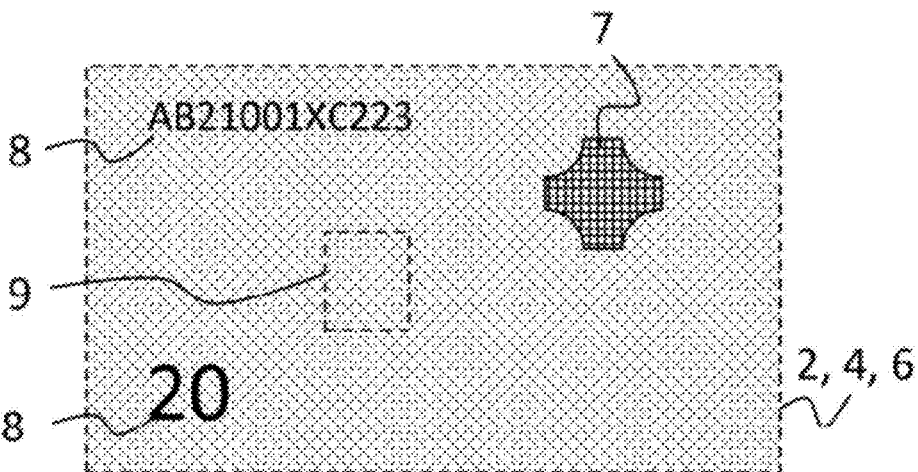
FIG. 4 shows an exemplary embodiment of a card according to the invention shown schematically in plan view.

FIG. 4 shows a paper-like layer 2, 4, 6, as can be used in the laminated card K according to FIGS. 1 to 3, for example. Alternatively, the card is not a laminated layer and the card body is not formed by a plurality of layers but is formed in one piece.

FIG. 4 shows a card K according to the invention. This card K has a substrate in the form of a banknote layer 2, 4, 6 (=substrate or paper-like layer) according to the type previously described. Visible data 8 are arranged on the substrate 2, 4, 6. These visible data 8 are, for example, the nominal value "20" of a currency of a series of banknotes that the issuer of the card also issues or manages. This visible data 8 is, for example, the serial number "AB21001XC223" of the card K. The visible data 8 may also be a "country" of the currency/issuer; a "currency" or the name of the issuer, for example the name of the central bank. In addition, the "name" of the cardholder (or a pseudonym thereof) or the type of card may also be specified.

In addition, two visible features 7, 7a are shown on the substrate 2, 4, 6. These visible features 7 are typical security features, i.e. optically variable features-such as tilt-effect images, holograms, kinegrams—a security print—such as guilloches or intaglio printing—a watermark, overhead/see-through features or front/back features, or transfer elements such as patches or strips with or without their own carrier substrate. The visible feature 7 may also be regarded as the overall layout or the format of the data or meta-information contained therein, here for example the position of the basic value "20". Of course, a visible feature 7, 7a or security feature may also contain visible data, for example the security strip has recesses in the form of text. However, the visible data are then additional information. For example, a text or a number may be printed with an optically variable ink or coated with a multi-layer structure that shows an overhead/see-through effect and may thus form a visible feature 7 or security feature.

Additionally or alternatively, the visible feature 7a may be a security element integrated on the substrate 2, 4, 6 or in the substrate 2, 4, 6, for example a security thread or a window thread.

The visible feature 7 may be a technically uniform feature of the series of banknotes, for example a hologram, a kinegram, a foil element over a window or a strip with an optically variable/floating motif. Alternatively, the visible feature 7 may be a visually consistent feature of the series of banknotes, for example the representation of the "country" always as a map, or the currency symbol in a particular design, or the alphanumeric characters in a particular design. Alternatively, the visible feature 7 may be meta-information of the series of banknotes, for example the positioning of the basic value of the banknote in the same place on the card K or a person on the front and a building on the back of the card K.

A computing unit 9 in the card K is indicated in a dashed shape in FIG. 4. The computing unit is part of a semiconductor chip (not shown) which includes the computing unit 9 and possibly a memory in order to manage, for example receive and/or send, and/or modify (switch, split, merge) electronic coin data records. The computing unit 9 may be a microcontroller or microprocessor. Not shown are interface or output or input units of the card K, by means of which the electronic coin data records may be introduced/issued (transmitted) into the card K, possibly also displayed or even selected. For this purpose, the card K may also be connected to a terminal, for example a pay machine, end device, etc. (not shown) in a manner ready for operation.

Figure 5:
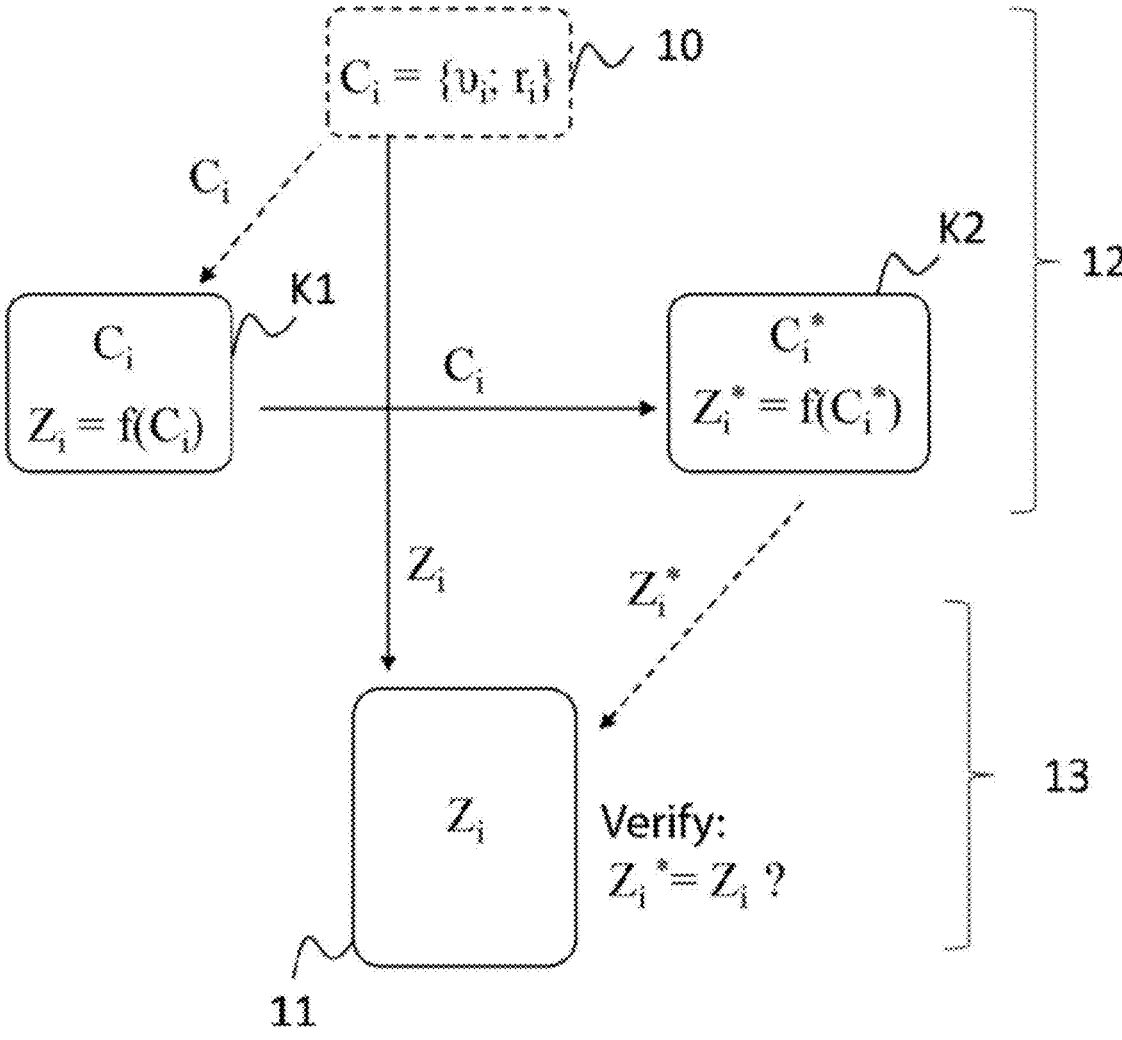
FIG. 5 shows an exemplary embodiment of a payment system for exchanging electronic coin data records using the card according to the invention.

FIG. 5 shows a system for exchanging electronic coin data records according to the innovative digital payment system, as shown in German patent applications DE102019002732 and DE102019002731, as it can be implemented using cards K according to the invention as "terminals". All changes/ modifications to an electronic coin data record suggested here serve to manage the electronic coin data records.

Here, an electronic coin data record $C_i$ is created in an issuer entity 10, for example a central bank. The central bank also issues a series of banknotes. A masked electronic coin data record $Z_i$ is generated for the electronic coin data record $C_i$, is provided with a concealment amount and registered in a "concealed electronic data record ledger". In the context of this invention, a ledger is understood to be a list, a directory, preferably a database structure. The electronic coin data record $C_i$ is transferred to a first card K1. For this purpose, the card K1 includes a contactless or contact-based interface.

For example, a genuine random number was generated as the concealment amount $r_i$. This concealment amount $r_i$ is linked to a monetary amount vi and then forms an i-th electronic coin data record according to the invention:

$$C_i = \{v_i; r_i\} \tag{1}$$

A valid electronic coin data record can be used for payment. The owner (cardholder) of the two values $v_i$ and $r_i$ is therefore already in possession of the digital money as the innovative digital means of payment. However, the digital money is defined in the system by a pair consisting of a valid electronic coin data record and a corresponding masked electronic coin data record $Z_i$. The masked electronic coin data record $Z_i$ is obtained by applying a homomorphic one-way function $f(C_i)$ according to Equation (2):

$$Z_i = f(C_i) \tag{2}$$

This function $f(C_i)$ is public, i.e. every system participant may call and use this function. This function $f(C_i)$ is defined according to Equation (3):

$$Z_i = v_i \cdot H + r_i \cdot G \tag{3}$$

where H and G are generator points of a group G, in which the discrete logarithm problem is hard, with the generators G and H, for which the discrete logarithm of the respective other base is unknown. For example, G and H are generator points of elliptical curve cryptography, ECC—that is, private keys of the ECC. These generator points G and H must be chosen in such a way that the relationship between G and H is not publicly known, so that with:

$$G = n \cdot H \tag{4}$$

the link n must be practically impossible to find in order to prevent the monetary amount $v_i$ from being manipulated while a valid $Z_i$ can still be calculated. Equation (3) is a "Pederson commitment for ECC" ensuring that the monetary amount $v_i$ can be passed, i.e. "committed", to a monitoring entity 2 without revealing it to the monitoring entity 2. Therefore, only the masked coin data record $Z_i$ is sent (revealed) to the public and remote monitoring entity 2.

Even though encryption based on elliptical curves is or is described in the present example, another cryptographic method based on a discrete logarithmic method would also be conceivable.

Due to the entropy of the concealment amount $r_i$, Equation (3) allows for a cryptographically strong $Z_i$ to be obtained even with a small range of values for monetary amounts Vi. This means that a simple brute force attack by simply estimating monetary amounts vi is practically impossible.

Equation (3) is a one-way function, which means that the computation of $Z_i$ from $C_i$ is easy because an efficient algorithm exists, whereas the computation of $C_i$ from $Z_i$ is very difficult because there is no algorithm that can be solved in polynomial time.

In addition, Equation (3) is homomorphic for addition and subtraction, i.e. the following applies:

$$Z_i + Z_j = (v_i \cdot H + r_i \cdot G) + (v_j \cdot H + r_j \cdot G) = (v_i + v_j) \cdot H + (r_i + r_j) \cdot G \quad (5)$$

Thus, addition operations and subtraction operations can be carried out both in the direct transaction layer 12 and also in parallel in the accounting layer 13 without the accounting layer 13 having knowledge of the electronic coin data records $C_i$. The homomorphic property of Equation (3) allows for accounting of valid and invalid electronic coin data records $C_i$ on the sole basis of the masked coin data records $Z_i$ and ensuring that no new monetary amount $v_j$ has been created.

Due to this homomorphic property, the coin data record $C_i$ can be split according to Equation (1) into:

$$C_i = C_j + C_k = \{v_j; r_j\} + \{v_k; r_k\} \quad (6)$$

where:

$$v_i = v_j + v_k \quad (7)$$

$$r_i = r_j + r_k \quad (8)$$

The following applies to the corresponding masked coin data records:

$$Z_i = Z_j + Z_k \quad (9)$$

With Equation (9), for example, a "split" processing or a "split" processing step of a coin data record according to FIG. 3 may be checked in a simple manner without the monitoring entity 11 having knowledge of $C_i$, $C_j$, $C_k$. Specifically, the condition of Equation (9) is checked to validate split coin records $C_j$ and $C_k$ and invalidate coin record $C_i$.

In the same way, electronic coin data records may also be put together (joined).

In addition, it is necessary to check whether (not allowed) negative monetary amounts are registered. An owner of an electronic coin data record $C_i$ must be able to prove to the monitoring entity 11 that all monetary amounts vi in a processing operation are within a value range of $[0, \ldots, n]$ without informing the monitoring entity 11 about the monetary amounts vi. These proofs of range are also called "range proofs". Ring signatures are preferably used as range proofs. For the present exemplary embodiment, both the monetary value and the concealment amount of an electronic coin data record are resolved in bit representation, i.e. $v_i = \Sigma a_j * 2^j$ for $0 \leq j \leq n$ and $a_j$ "element" $\{0; 1\}$ and $r_i = \Sigma b_j * 2^j$ for $0 \leq j \leq n$ and $b_j$ "element" $\{0; 1\}$. A ring signature with $C_{ij} = a_j \cdot H + b_j \cdot G$ and $C_{ij} - a_j \cdot H$ is preferably carried out for each bit, wherein, in one embodiment, it is possible to carry out a ring signature only for certain bits.

In FIG. 5, an electronic coin data record Ci is generated by the issuer entity 10 and a masked electronic coin data record Zi is calculated by the issuer entity 10 using Equation (3) and registered in the monitoring entity 11. The first terminal K1 subsequently transmits the electronic coin data record Ci to a second card K2. Before that, the terminal may optionally carry out one of the processing steps (switching, joining, splitting). The transmission takes place wirelessly via WLAN, NFC or Bluetooth, for example. The transmission may be additionally secured by cryptographic encryption methods, for example by negotiating a session key or using a PKI infrastructure.

The transmitted electronic coin data record $C_i$ is received as $C_i^*$ in the second card K2. When the electronic coin data record $C_i^*$ is received, the second card K2 is in possession of the digital money represented by the electronic coin data record $C_i^*$. If both cards K1, K2 trust each other, no further steps are necessary to end the process. However, the card K2 does not know whether the electronic coin data record $C_i^*$ is actually valid. In addition, the card K1 could also transmit the electronic coin data record $C_i$ to a third terminal (not shown). In order to prevent this, further preferred steps are provided in the method.

In order to check the validity of the received electronic coin data record $C_i^*$, the masked transmitted electronic coin data record $Z_i^*$ is calculated in the second card K2 with the—public—one-way function from Equation (3). The masked transmitted electronic coin data record $Z_i^*$ is then transmitted to the monitoring entity 11 and searched there. If there is a match with a registered and valid masked electronic coin data record, the validity of the received coin data record $C_i^*$ is indicated to the second card K2 and it is determined that the received electronic coin data record $C_i^*$ is equal to the registered electronic coin data record $C_i$. With the check for validity, it may be determined, in one embodiment, that the received electronic coin data record $C_i^*$ is still valid, i.e. that it has not already been used by another processing step or in another transaction and/or was subject to another change.

Preferably, the electronic coin data record obtained is then switched.

It is essential to the method that the sole knowledge of a masked electronic coin data record $Z_i$ does not entitle to spend the digital money. The sole knowledge of the electronic coin data record $C_i$, however, entitles to pay, i.e. to successfully carry out a transaction, in particular if the coin data record $C_i$ is valid. There is a 1-to-1 relationship between the electronic coin data records $C_i$ and the corresponding masked electronic coin data records $Z_i$. The masked electronic coin data records $Z_i$ are registered in the monitoring entity 11, for example a public decentralized database. This registration makes it possible to check the validity of the data record, for example whether new monetary amounts have been created (illegally).

A main distinguishing feature compared to conventional solutions is that the masked electronic coin data records $Z_i$ are stored in an accounting layer 13 and all processing operations on the electronic coin data record $Z_i$ are registered there, whereas the actual transmission of the digital money takes place in a (secret, i.e. one not known to the public) direct transaction layer 12.

In order to prevent multiple spending or to ensure more flexible transmission, the electronic coin data records can now be processed in the method according to the invention.

The following table 1 lists the individual operations, with the specified command also executing a corresponding processing step:

TABLE 1

| Number of operations to be carried out per processing of a coin data record in the terminal or issuer entity | | | | |
|---|---|---|---|---|
| Command or step | Create signature | Create random number | Create mask | Create range proof |
| Create | 1 | 1 | 1 | 0 or 1 |
| Deactivate | 1 | 0 | 1 | 0 or 1 |
| Split | 0 | 1 | 3 | 0 or 1 |
| Join | 0 | 0 | 3 | 1 |
| Switch | 0 | 1 | 2 | 1 |

Further operations not listed in Table 1 may be required. Instead of the implementation listed, other implementations implying other operations are conceivable. Table 1 above shows that, for each coin data record and each of the processing operations "create", "deactivate", "split", "join" and "switch", different operations "create signature"; "create random number"; "create mask"; "range proof" may be provided, each of the processing operations being registered in the monitoring entity 11 and being appended there in unchangeable form to a list of previous processing operations for masked electronic coin data records $Z_i$. The processing operations of "create" and "deactivate" on an electronic coin data record are only carried out in secure locations and/or only by selected entities, for example the issuer entity 1, while the operations of all other processing operations can be carried out on the cards K1, K2.

The number of operations for the individual processing is marked in table 1 with "0", "1" or "2". The number "O" indicates that the terminal or issuer entity 1 does not have to carry out this operation for this processing of the electronic coin data record. The number "1" indicates that the terminal or issuer entity 1 must be able to carry out this operation once for this processing of the electronic coin data record. The number "2" indicates that the card K or issuer entity 1 must be able to carry out this operation twice for this processing of the electronic coin data record.

In principle, it may also be planned, in one embodiment that a range proof is also carried out by the issuer entity 1 during creation and/or deactivation. The operations required for the monitoring entity 2 for the individual processing operations are listed in Table 2 below:

TABLE 2

| Number of operations to be carried out per processing of a coin data record in the monitoring entity | | | |
|---|---|---|---|
| Command or step | Checking the signature of the issuer | Checking the validity of the masked electronic data record | Checking range proof | Checking homomorphic properties of the masked electronic coin data records, i.e. adding |
| Create | 1 | 0 | 0 or 1 | 0 |
| Deactivate | 1 | 1 | 0 or 1 | 0 |
| Split | 0 | 1 | 2 or more | 1 |
| Join | 0 | 2 or more | 1 | 1 |
| Switch | 0 | 1 | 1 | 0 |

Further operations not listed in Table 2 may be required. Instead of the implementation listed, other implementations implying other operations are conceivable. All operations of Table 2 can be carried out in the monitoring entity 11, which, as a trusted entity, for example as a decentralized server, in particular a distributed trusted server, ensures sufficient integrity of the electronic coin data records.

Table 3 shows the components to be preferably installed for the system participants in the payment system of FIG. 1:

TABLE 3

| Preferred units in the system components | | | |
|---|---|---|---|
| Command or step | Issuer entity 11 | Card | Monitoring entity |
| Random number generator (high security) | Yes | — | — |
| Random number generator (deterministic) | — | Yes | — |
| PKI for signing | Yes | — | — |
| PKI for checking signature | — | (Yes) | Yes |
| Read access on DLT | Yes | Yes | Yes |
| Write access on DLT | Yes | Yes | Yes |
| Deactivating the electronic coin data record | Yes | Yes | — |
| Transport encryption | Yes | Yes | — |
| Safe storage | (Yes) | Yes | —/Yes |
| Masking unit | Yes | Yes | — |
| Range proof | — | Yes | — |
| Checking range proof | — | — | Yes |
| DLT software | — | — | Yes |

Table 3 shows an overview of the components to be preferably used in each system participant, i.e. the issuer entity 10, a card K1 and the monitoring entity 1. The card K1 may be configured as a wallet for electronic coin data records, i.e. as an electronic purse, i.e. a data storage of the card or of a terminal with which the card can be operated and in which a large number of coin data records can be stored, and may be implemented, for example, in the form of an application on a smartphone or IT system of a retailer, a commercial bank or another market participant, and send or receive an electronic coin data record. Thus, the components in the card as shown in Table 3 are implemented as software. It is assumed that the monitoring entity 11 is based on a DLT and is operated by a number of trusted market participants.

Figure 6:
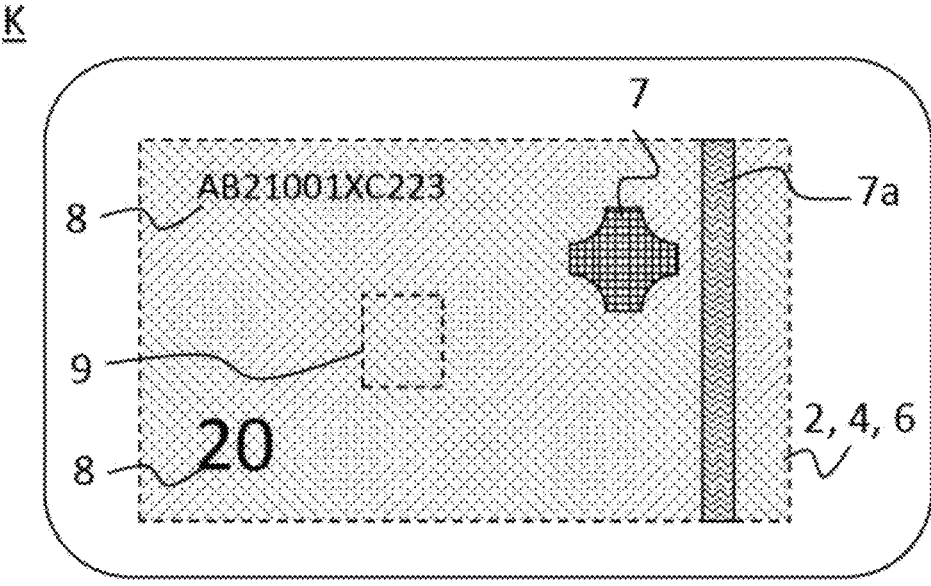
FIG. 6 shows a further exemplary embodiment of a card according to the invention shown schematically in plan view.

The banknote substrate 2, 4, 6 shown in FIG. 4 is laminated into a card K in FIG. 6. It is apparent that the final dimensions of the banknote substrate 2, 4, 6 are smaller than the dimensions of the card K. The card K is in the ID-1 card format. Other card formats are also conceivable.

Within the scope of the invention, all of the elements described and/or drawn and/or claimed may be combined with one another as desired.

The invention claimed is:

1. A card comprising:
   a card body;
   a semiconductor chip integrated within the card body and configured to store and manage electronic coin data records issued by a central entity; and
   an interface unit for contactless or contact-based communication between the card and a terminal or a second card;
   wherein the semiconductor chip is coupled to the interface unit and is configured to send an electronic coin data record to the second card or to receive an electronic coin data record from the second card by a secured transmission negotiated using a session key or a public-key infrastructure;

wherein the card body has visible data, and wherein the card body has at least one visible feature defining a banknote series security element allowing authenticity verification of the card, the banknote series security element identifying a series of banknotes issued by the central entity, such that the at least one visible feature identifies the card as authentic to the central entity.

2. The card of claim 1, wherein the banknote series security element corresponds to a uniform security element.

3. The card of claim 1, wherein the visible feature being one or more of:

a security thread, a security patch, and a security strip.

4. The card of claim 1, wherein a series of banknotes is a series of banknotes of different denominations; and/or said visible data include a number, letters, text and/or other characters.

5. The card according to claim 1, wherein said at least one visible feature is a series feature and said series feature is:

a technically uniform feature used throughout said series of banknotes; and/or an optically uniform feature used throughout said series of banknotes; and/or a piece of meta-information used throughout said series of banknotes; and/or a pattern used throughout said series of banknotes.

6. The card according to claim 1, wherein said at least one visible feature is an independent series feature for said card or is from a collection of existing series features from said series of banknotes.

7. The card according to claim 1, wherein said card body is multi-layered and wherein said at least one visible feature is arranged on or in an inner layer of said card body.

8. The card according to claim 7, wherein a security element is arranged as a visible feature on or in said inner layer.

9. The card according to claim 1, wherein said card body is multi-layered and an inner layer of said card body is a banknote.

10. The card according to claim 1, wherein an issuer of said card is a commercial bank.

11. The card according to claim 1, wherein said card includes an input unit for user inputs, including for controlling the managing of the electronic coin data records, and/or an interface unit.

12. The card according to claim 1, further comprising an input unit configured to control transmission of the electronic data coin records from the card to the terminal based on user input.

13. The card according to claim 12, wherein said input unit comprises a button and/or a fingerprint sensor.

14. The card according to claim 1, wherein said electronic coin data records each comprise a concealment amount and a monetary amount.

15. The card according to claim 1, wherein said card body is multi-layered and an inner layer of said card body is a banknote substrate laminated into the card body, wherein the banknote substrate is smaller than other layers of the card body.

* * * * *